July 4, 1967     G. DE COYE DE CASTELET     3,329,132

DIFFERENTIAL SUPERCHARGING UNIT FOR ROTARY ENGINES

Filed Sept. 13, 1965

Inventor
Gaëtan De Coye De Castelet

Stevens, Davis, Miller & Mosher
Attorneys

United States Patent Office 3,329,132
Patented July 4, 1967

3,329,132
DIFFERENTIAL SUPERCHARGING UNIT FOR ROTARY ENGINES
Gaëtan de Coye de Castelet, Billancourt, France, assignor to Regie Nationale des Usines Renault, Billancourt, France
Filed Sept. 13, 1965, Ser. No. 486,993
Claims priority, application France, Sept. 21, 1964, 988,830, Patent 1,416,477
3 Claims. (Cl. 123—8)

Differential supercharging units for combustion engines are already known.

Various propositions have already been made in this field, which comprise a piston engine of the controlled ignition type, or preferably of the ignition compression type, wherein the power output shaft extends into a differential of which the two outputs provide the one the drive for the wheels of the vehicle and the other the drive for the engine supercharger.

The most interesting solution consists in providing a differential comprised of an epicyclic gear train wherein the engine output shaft drives the planet carrier, the vehicle driving shaft being driven in turn by the toothed annulus and the supercharger drive shaft by the sun gear.

By properly selecting the dimensions of the various components of the epicyclic gear train it is possible to obtain directly in the differential the balance between a low torque for driving the supercharger and a high torque for driving the vehicle, and in the case of high loads for causing the differential to revolve as a unit or at least with a very low speed variation, thus reducing friction and increasing the efficiency of the transmission.

This invention is concerned with the application of a differential supercharger to a rotary engine, this supercharger being preferably of the centrifugal type, this arrangement being characterized in that the sun gear of the differential drives the centrifugal supercharger by means of a shaft extending coaxially through the crankshaft of the rotary engine, the final gear step-up being provided by another epicyclic gear train disposed adjacent the supercharger on the opposite side of the engine.

Of course, it is advantageous, in the supercharging of a rotary engine having radially-distributed working chambers to dispose the supercharger coaxially and on the side opposite to the flywheel, because with this arrangement all inlet pipes are identical, this constituting a particularly interesting feaure.

On the other hand, it is obvious that the total step-up ratio, in the case of a centrifugal supercharger driven according to the differential principle, should be considerably higher than in the case of a volumetric supercharger; therefore, it is advisable to select a two-step cascade multiplication wherein the two ratios have the same order of magnitude, with one step-up gear incorporated in the differential and the other disposed after the passage through the crankshaft, for with this arrangement the higher the load the lower the relative velocity of the crankshaft and of the shaft extending therethrough; at the limit, it may even happen that the differential will revolve as a unit, which is obviously in favour of mechanical efficiency. In this limit case the conditions at the crankshaft output end are those of a conventional centrifugal supercharger drive through a conventional step-up gear. As the engine torque decreases, the shaft extending through the crankshaft revolve slower than this crankshaft and the supercharger will also revolve proportionally slower, thus providing a lower supercharging pressure.

Another feature characterizing this invention relates to the regulation of the supercharged rotary engine when te engine is of the compression ignition type.

In a compression ignition engine the driver's intention is expressed in the form of variations in the fuel pump control; thus, for a given position of the accelerator the engine speed must be controlled by means of the fuel pump, this regulation being controlled as a rule by the engine speed.

As an additional feature of this invention it is proposed herein to regulate the engine speed by utilizing to this end the action exerted by the pressure prevailing in the inlet manifold downstream of the supercharger upon the injection pump.

Thus, for a given position of the accelerator pedal, when the pressure increases in the inlet manifold or induction pipe, this pressure depresses slightly a diaphragm whereby the pump rack is caused to recede in the direction to reduce the injection fuel. Thus, a certain stability is imparted to the engine. Of course, the accelerator pedal acts upon said rack through the medium of a spring in opposition to the feed pressure.

It will be seen that this device will already impart a safety characteristic to the supercharger speed. In fact, if the supercharger revolves too fast, its pressure increases and the fuel output drops, thus reducing the engine torque, and as the demand applied to supercharger is reduced its speed will also drop. As an additional safety measure a relatively large safety valve mounted in the feed pipe may be contemplated. Thus, if the speed of the supercharger becomes abnormally high, and assuming that the engine has not yet been given sufficient time to slow down under the control of the above-described regulating means, the safety valve will be suddenly unseated to release the excess pressure corresponding to the excess speed contemplated and the air output will suddenly increase, thus readily braking or retarding the supercharger.

The invention will now be described with reference to the attached drawing in which.

Figure 1:
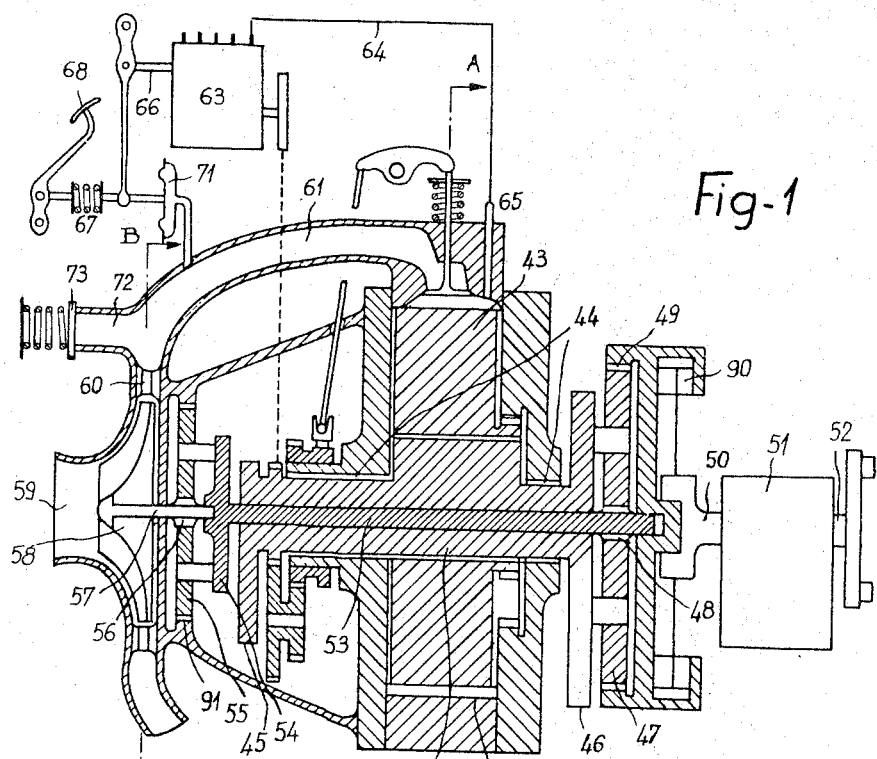
FIGURE 1 is a longitudinal section showing a rotary engine having an epicyclic rotor comprising N lobes and a stator having a conjugate contour having $N+1$ working chambers, with a valve gear and a differential-mounted centrifugal supercharger.

In FIGURE 1 there is shown diagrammatically a rotary engine having an internal epicycloid 41, which comprises a crankshaft 42 carrying a rotor resolving in bearings 44. At the left-hand end of the engine as shown in the drawing is the disc 45 carrying a balance weight, and at the right-hand end is another disc 46 also supporting a balance weight but carrying on the other hand the planet wheels 47 meshing with a sun wheel 48 and with the internally-toothed annulus 49. The annulus 49 of this construction is rigid with a clutch 90 carried by the input shaft 50 of the gearbox or change-speed gear 51, the output shaft shaft 52 of this gearbox being if desired concentric with the input shaft 50 and comprise a direct drive.

The shaft 53 carrying the sun gear 48 extends coaxially through the hollow crankshaft 42 and controls, with a step-up ratio of the same order as that obtained in the differential and by means of a planet carrier 54 and planet wheels 55 engaging a stationary annulus 91, the movement of a pinion 56 keyed on shaft 57 of the supercharger impeller 58 disposed coaxially to the engine. The air flowing through the filter (not shown) penetrates into the supercharger at 59 and after the impeller 58 flows through a diffuser 60 also visible in FIGURE 2, this air being subsequently directed through pipes 61 into the combustion chambers of the rotary engine.

Figure 2:
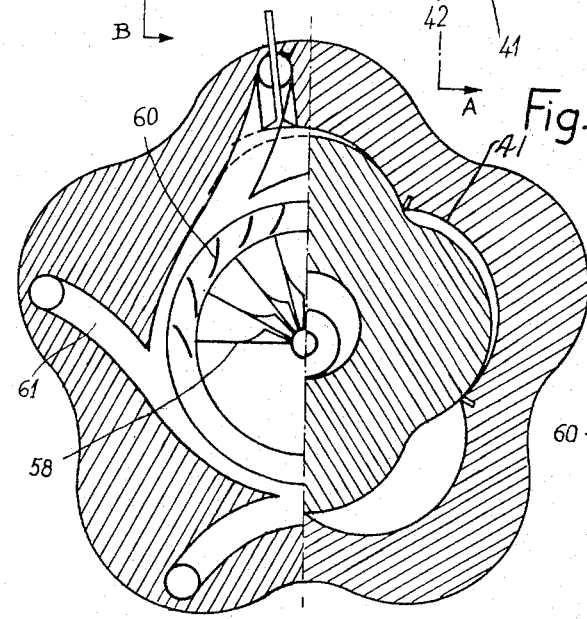
FIGURE 2 is a cross section taken upon the planes A—A and B—B of FIGURE 1.

In FIGURE 2, which is a cross-sectional view of the engine illustrated in FIGURE 1, it will be seen that this engine comprises a four-lobed rotor and a stator comprising five working chambers and therefore five pipes 61 all strictly identical to one another.

The fuel injection pump 63 is normally driven from the crankshaft 42 for example by means of a transmission chain; it is adapted to feed the engine injectors 65 through delivery pipes such as 64.

The regulating device consistent with the above-explained definition is constructed as follows:

The rack 66 of the fuel injection pump is controlled by the accelerator pedal 68 by means of a spring 67 acting in opposition to the compressed-air responsive diaphragm 71 communicating with one of said inlet pipes 61, whereby a considerable reduction in the amount of injected fuel is obtained as the feed pressure increases.

Also branched off the pipe 61 is a pipe section 72 normally closed by a safety valve 73 adapted to be unseated when the pressure in said pipe exceeds a predetermined limit corresponding to the maximum permissible supercharger speed.

Although an in-line injection pump has been illustrated in the drawing, it will be readily understood that the device may also be operated by using a radial rotary pump, this pump type being on the other hand particularly suited in the case of a rotary engine having radially disposed working chambers.

Similarly, the supercharger illustrated comprises only one impeller 58, but it would not constitute a departure from this invention to substitute a multi-stage supercharger therefor.

Figure 3:
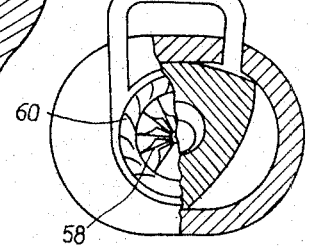
FIGURE 3 is a cross section showing a structure similar to the one depicted in FIGURE 1 but in the case of a rotary engine in which ports are substituted for the valves.

Of course, the device constituting the subject-matter of this invention is also applicable to other types of rotary engines, such as the one illustrated diagrammatically in FIGURE 3 which comprises an epicyclic or hypocyclic stator contour with N lobes and a rotor comprising $N+1$ sides and $N+1$ edges, the concentric arrangement of the supercharger remaining highly advantageous in spite of the use of a single induction port.

I claim:

1. Compression-ignition rotary engine having a centrifugal supercharger mounted as a differential on the power output member of the engine, wherein the sun gear of the differential drives the centrifugal supercharger by means of a shaft extending coaxially through the crankshaft of the rotary engine, the final gear step-up being provided by another epicyclic gear train disposed adjacent the supercharger on the opposite side of the engine.

2. Compression-ignition rotary engine as set forth in claim 1, wherein the step-up ratio of said differential and the step-up ratio at the output end of said crankshaft for driving said supercharger have the same order of magnitude.

3. Compression-ignition rotary engine according to claim 1, wherein the positive feed pressure is utilized as a parameter for regulating the engine by decreasing the amount of fuel injected therein as the pressure increases.

References Cited

UNITED STATES PATENTS

| 1,482,627 | 2/1924 | Bullington. | |
| 1,732,405 | 10/1929 | Invernizzi | 123—119 |
| 3,139,722 | 7/1964 | Yokoi | 123—8 |

FOREIGN PATENTS

| 1,302,568 | 7/1962 | France. |

MARK NEWMAN, *Primary Examiner.*

R. D. BLAKESLEE, *Examiner.*